Oct. 7, 1952 — L. W. BOLEY — 2,612,677
INSPECTION APPARATUS
Filed Oct. 10, 1951 — 3 Sheets-Sheet 1
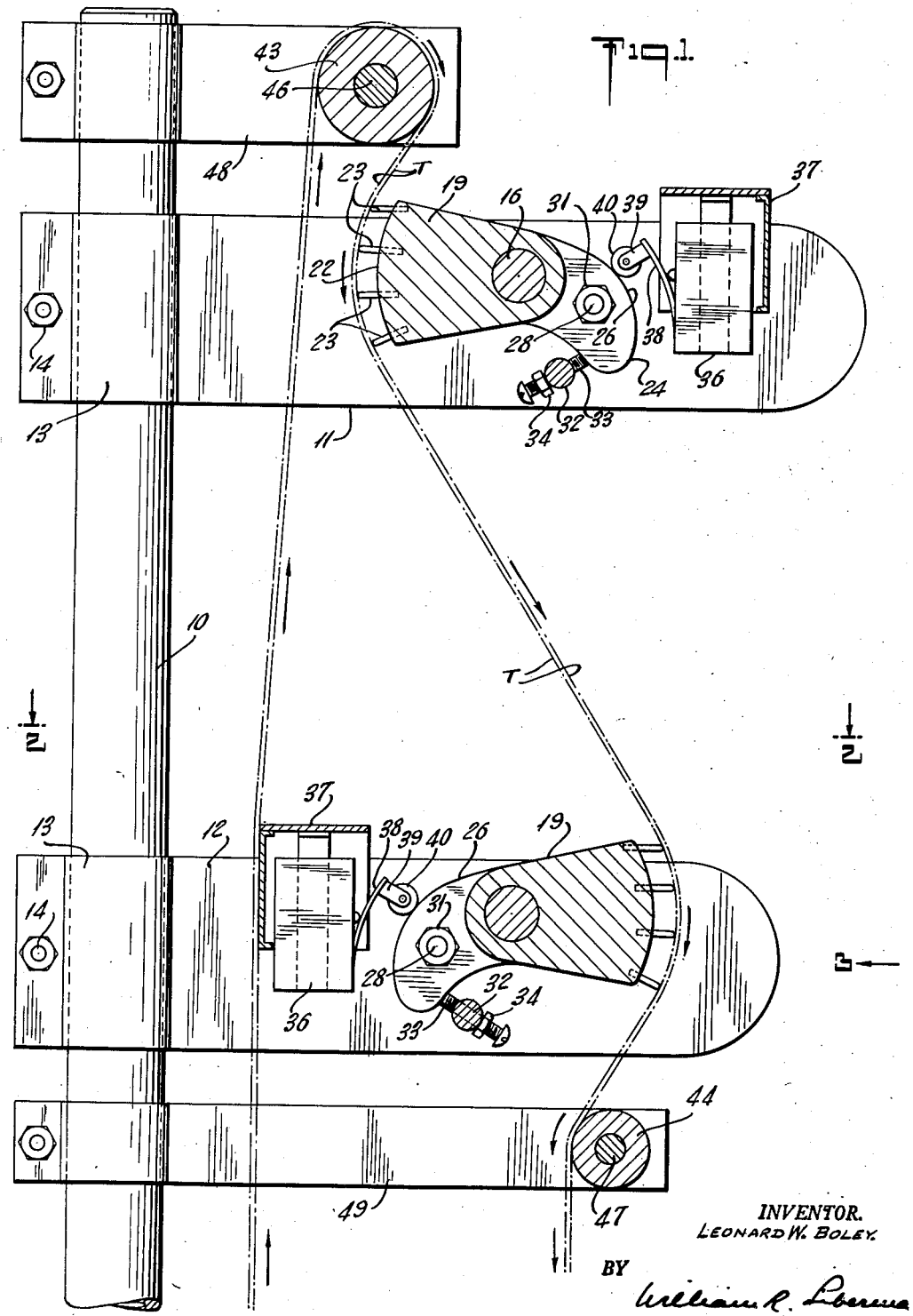
INVENTOR.
LEONARD W. BOLEY.
BY
William R. Liberman
ATTORNEY.

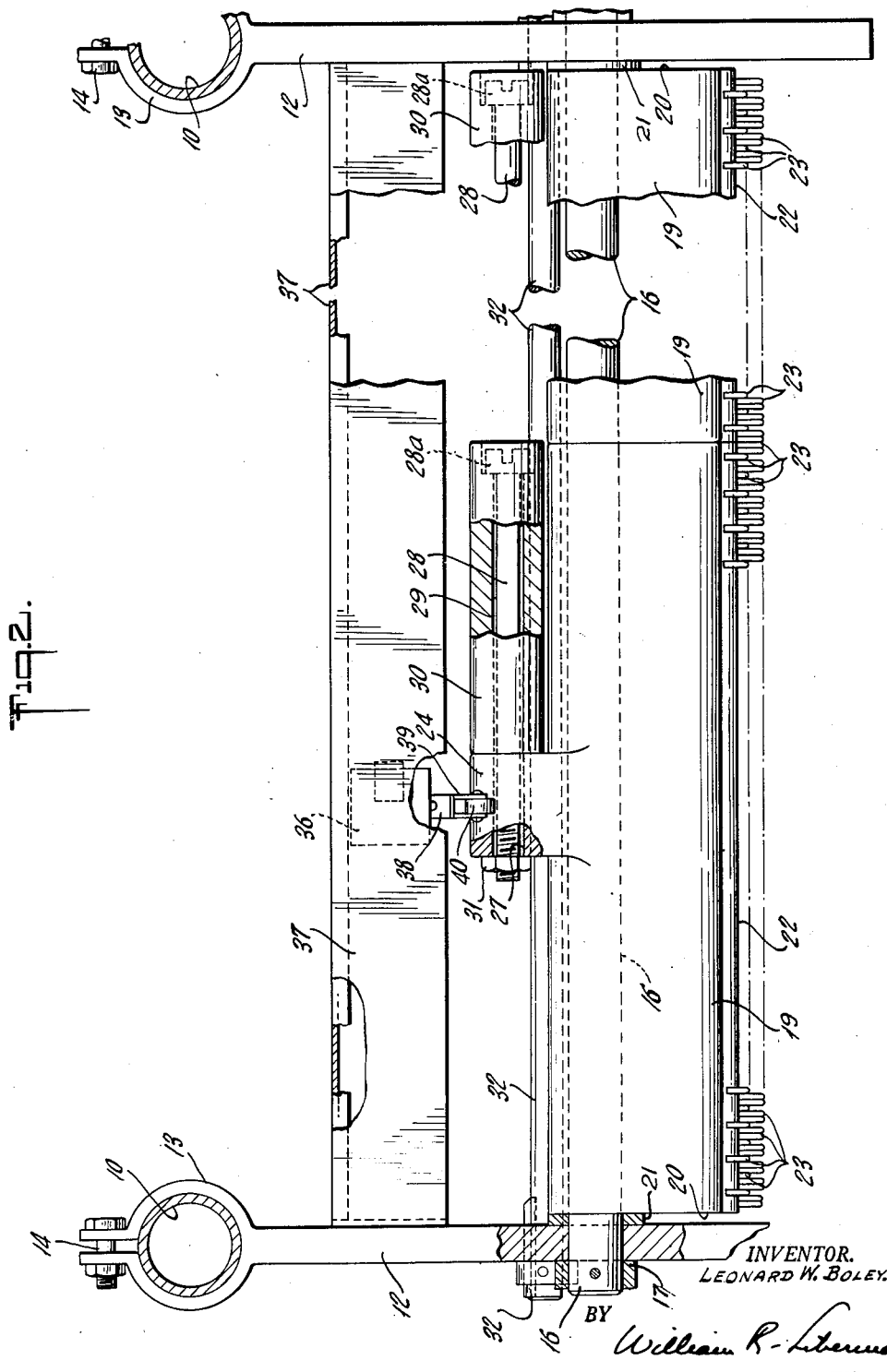

Oct. 7, 1952
L. W. BOLEY
2,612,677
INSPECTION APPARATUS
Filed Oct. 10, 1951
3 Sheets-Sheet 3
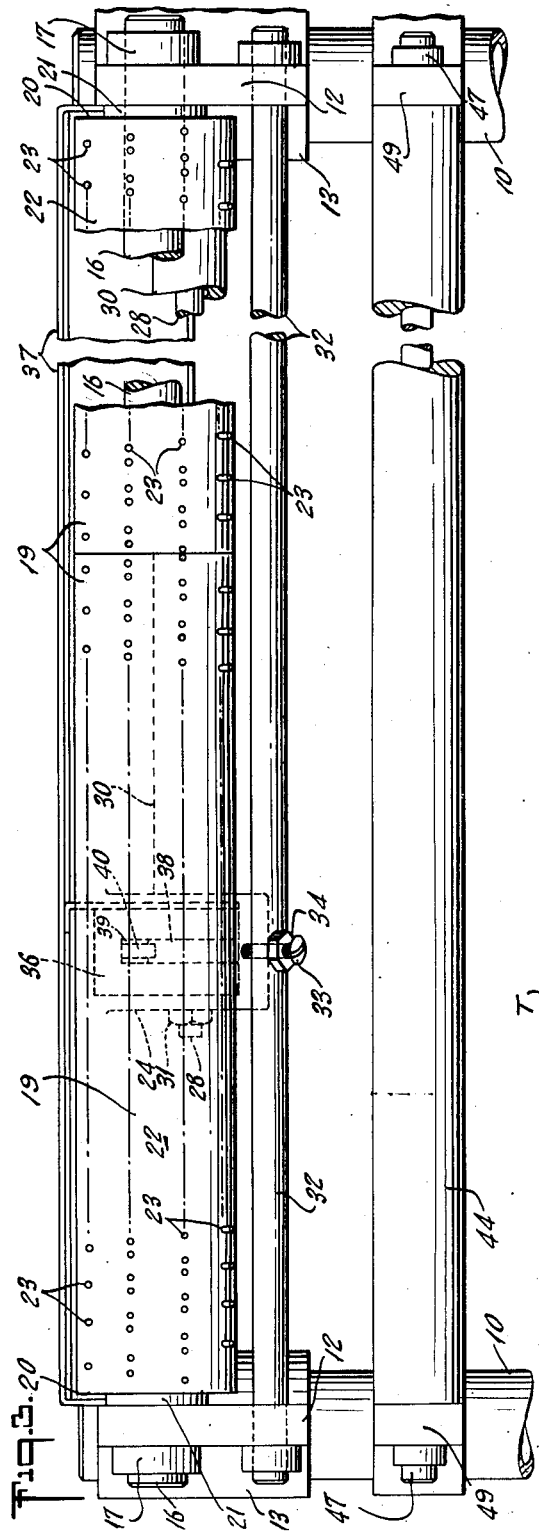
INVENTOR.
LEONARD W. BOLEY.
BY
William R. Lieberman
ATTORNEY.

Patented Oct. 7, 1952

2,612,677

UNITED STATES PATENT OFFICE 2,612,677

INSPECTION APPARATUS

Leonard W. Boley, Brooklyn, N. Y.

Application October 10, 1951, Serial No. 250,628

10 Claims. (Cl. 26—70)

The present invention relates generally to an improved inspection apparatus, and it relates more particularly to an improved apparatus for the detection of physical flaws or defects in continuous strips, webs, bands or pellicles, especially those formed of knitted or woven fabrics.

In the production, treatment, conversion or use of lengths of knitted or woven fabric, it is often necessary to locate any physical flaws or defects therein. This is done either to grade the fabrics, or to repair or eliminate the defective portions so that additional wasted processing is not imparted to the fabric, thereby resulting in economies. These defects or flaws may consist of tears, runs, dropped stitches or any greater than normal openings in the fabric, and what constitutes a normal opening depends primarily on the structure of the fabric. The fabric is generally subjected to a visual examination or inspection to explore for physical defects. Such visual inspection of the fabric is highly time-consuming and expensive. Furthermore, it is very trying upon the inspectors, being highly conductive to eyestrain, and major defects are often overlooked. The fabric examination is usually performed during the laying-up operation, which, of necessity, must be slow, to permit the proper inspection of the fabrics. Machines have been proposed for the automatic detection of fabric defects, but these machines have been unduly complicated, highly inflexible, slow, of low sensitivity, and possessing numerous other drawbacks.

It is, therefore, a principal object of the present invention to provide an improved inspection apparatus for the detection or locating of physical flaws and defects in webs, bands, pellicles, or the like.

Another object of the present invention is to provide an improved inspection apparatus for the detection or location of tears, runs, dropped stitches, or other undesirable holes in knitted and woven fabrics.

Still another object of the present invention is to provide an improved apparatus for the detection of physical defects in knitted or woven fabrics, which apparatus is simple, rugged, flexible and highly sensitive.

A further object of the present invention is to provide an improved apparatus for the detection of physical defects in knitted or woven fabrics which are either flat or tubular.

Still a further object of the present invention is to provide an improved apparatus for the detection of physical defects in knitted or woven fabrics, which may be readily employed in connection with the laying-up of the fabric.

Another object of the present invention is to provide an improved apparatus for the detection of physical defects in woven or knitted fabrics, which may be simply attached to conventional lay-up machines, whether motorized or manually operated.

Other, further, and more specific objects of the present invention will in part be pointed out specifically, and in part apparent from a reading of the following description, taken in conjunction with the accompanying drawings wherein, Figure 1 is a side elevational view of a preferred embodiment of the present invention, partly in section, and partly broken away for convenience of illustration;

Figure 2 is a sectional view along line 2—2 of Figure 1;

Figure 3 is a front elevational view of the lower portion of the apparatus seen in the direction of the arrow 3, Figure 1;

Figure 4 is a partial front elevational view illustrating the configurations assumed by a fabric passing along the defect sensing elements, and Figure 5 is a schematic diagram of the electric circuit employed with the apparatus.

An important feature of the present invention resides in the provision of a longitudinal support, having mounted thereon a plurality of projecting sensing elements or pins which are arranged on the support in a pattern extending longitudinally and transversely, in staggered relationship. Another important feature characterizing the present invention is the arrangement of the sensing elements or pins on the longitudinal support, so that their longitudinal extent is substantially continuous.

In accordance with a preferred embodiment of the present invention, there are provided upper and lower parallel sets of longitudinal support bars which are arranged in end-to-end relationship, each supported for independent limited rocking motion. The support bars are provided with front faces of cylindrical configuration, the upper and lower bars facing in opposite direction. Each of the support bars is suitably counterweighted and has associated with it a normally open electric switch which is closed upon the rocking of the bar about its longitudinal axis. Each switch is connected to a suitable signalling or actuating device. Projecting from the front cylindrical faces of each of the support bars are a plurality of sensing elements or pins. These pins are arranged in a zig-zag path extending longitudinally along the cylindrical faces.

Furthermore, the extent of the pins is substantially continuous or uninterrupted in a longitudinal direction. Suitable guide rolls are disposed above the upper and below the lower sets of support bars. In operation, a woven or knitted fabric is advanced in a tortuous path over the tips of the pins, by way of the guide rolls, any hole in the fabric being engaged by a coinciding pin, rocking the respective support bar and closing the associated electric switch. The closing of the switch may initiate any desired sequence of events.

Referring now to the drawings, which illustrate a preferred embodiment of the present invention, the numeral 10 generally designates a pair of laterally spaced vertical tubular standards mounted upon any suitable table, and may be associated with a lay-up machine, either manual or motor driven. Forwardly projecting upper and lower brackets 11 and 12 respectively, are supported upon the standards 10, the brackets being provided with sprung, confronting arcuate arms 13, engaging the standards 10, and provided with tightening bolts and nuts 14, which engage corresponding openings in ears extending from the arcuate arms 13 to permit the vertical adjustment of the brackets 11 and 12, and the supported mechanisms. The upper pair of brackets 11 and the lower pair of brackets 12 each are normally adjusted to equal levels. A horizontal axle 16 is supported between each pair of brackets 11 and 12, intermediate the ends thereof, and is fixed by means of collars 17 engaging the ends of the axles 16 and abutting the outer faces of the brackets 11 and 12.

A plurality of support bars 19 having longitudinal bores formed therein, are rotatably mounted on the axles 16, which engage said longitudinal bores. The support bars are arranged in abutting end-to-end relationship, the free end faces 20 of the end support bars 19 being spaced from the confronting faces of the brackets by washers 21. The front faces 22 of the support bars 19 are cylindrically shaped, being of arcuate cross section, whose centers are that of the axle 16 and the engaging bore. A plurality of outwardly projecting sensing elements or pins 23 are mounted on the front faces 22 of the support bars 19, and are arranged in vertical zig-zag fashion, forming four horizontal rows. As clearly seen in Figure 2 of the drawing, the peripheral projections of the pins 23, along the surface of the front faces 22, abut or may overlap each other, to define a plurality of pins 23 being uninterrupted in their longitudinal extent along the front faces 22.

In the preferred embodiment, which has been found to operate to excellent advantage, the radius of the front face 22 is approximately 1¼", having its center at the axis of the bar 19, as aforesaid, and the rows of pins are spaced about ⅜". The two intermediate rows of pins 23 radiate from an axis spaced approximately 5⅛" rearwardly of the medial longitudinal line on the surface of the front face 22, in a line with the center of the axle 19, and their bases lie along lines which are equidistant from said medial longitudinal line. The lower row of pins 23 radiate in directions from the axis of the axle 19, and the upper row of pins are parallel to the radii between said axis and the said medial longitudinal line on the front face 22. The height of the pins 23 is approximately ¼".

Each of the support bars 19 is provided with a rearwardly extending lug 24, having an upper cam surface 26 and a longitudinal bore 27. A bolt 28 engages the bore 27 and a longitudinal bore 29 formed in a tubular counter-weight 30, the head 28a of the bolt 28 nestling in the enlarged end of the bore 29. A nut 31 engages the end of the bolt 28, passing through the bore 27, permitting the rigid securing of the counter-weight 30 to the lug 24. The mass disposition of the counter-weight 30 is such as to impart a slight counter-clockwise torque to the lower support bars 19, as viewed in Figure 1 of the drawings.

Also supported between each pair of brackets 11 and 12 are rods 32 which are parallel to and positioned below the respective axles 16. Formed in each of the rods 32 are a plurality of diametrically extending tapped bores which are aligned with the lower faces of corresponding lugs 24. A set screw 33 engages each of the tapped bores and has its front end abutting the lower face of the corresponding lug 24, and is provided with a lock nut 34. Thus, by means of the screws 33, the rotation of the support bar 19 imparted by the counter-weight 30 is limited, thereby defining the dormant position of the support bars 19, which is preferably substantially that illustrated in the drawings, but may be adjusted in accordance with the surrounding conditions, such as the type of fabric being inspected, the rate of speed, etc.

Associated with each of the support bars 19, is a normally open electric switch 36 which is mounted on the inner face of a laterally extending horizontal angle member 37 supported between each pair of brackets 11 and 12. Each of the electric switches 36 is provided with an outwardly spring actuating arm 38, which supports at its free end, by means of a bracket 39, a roller 40. The roller 40 bears against the upper cam face 26 of the lug 24 and defines a cam follower. Thus, a sufficient rocking or rotation of any of the support bars 19, even of some slight extent, will result in a closing of the corresponding electric switch 36.

An electrically actuated signal or indicating device 41 such as an electric lamp or the like, is connected in series with each of the switches 36, and through the solenoid 42 of a suitable relay to a source of current. Thus, upon the sufficient rotation of a support bar 19, and, thence, the closing of a switch 36, a corresponding signal device 41 is actuated, thereby indicating that the support bar 19 has been rotated or rocked. Furthermore, the solenoid 42 is energized, the relay actuated thereby may control another signal device, which may be a bell or the like, or may control any other device, for example, the motor driving a lay-up machine, which may be thereby stopped or disengaged.

A rotatable laterally extending horizontal web guide roll 43 and 44 respectively, is associated with each support bar 19, and is of cylindrical shape and mounted on corresponding shafts 46 and 47. The guide roll 43 is supported above the upper set of support bars 19 by means of an upper pair of vertically adjustable brackets 48, and the guide roll 44 is supported below the lower set of guide bars 19, by means of a lower pair of vertically adjustable brackets 49, the brackets 48 and 49 also being mounted on the standards 10.

Furthermore, the front edge of the roller 43 lies forward of the tips of the upper row of pins 23 on the upper support bar 19, whereas the rear edge of the roller 44 lies rearwardly of the tips of the lower row of pins 23 on the lower support bar 19. Moreover, the plane of the tips of the pins 23 in the upper support bar 19 lies rearwardly of the plane of the tips of the pins 23 on the lower support bar 19.

Considering now the operation of the improved apparatus, a continuous length of woven or knitted fabric T here illustrated as being a flattened tube, is laced into the apparatus, by being passed upwardly behind the lower angle support 37 and upper guide 43, over the guide roll 43, over the tips of the pins 23 mounted on the upper support bar 19, downwardly and forward, and thence over the tips of the pins 23 mounted on the lower support bar 19, rearwardly and downwardly and along the rear surface of the lower guide roll 44. The yarn is advanced either manually or by any convenient and well known means along the tortuous path, and in the direction as aforesaid. As long as the fabric T is physically perfect, it will slide over the tips of the pins 23 and will not impart sufficient torque by way of pins 23 to the support bars 19 to rock them sufficiently to actuate the corresponding electric switch 36. However, the presence of a hole in the fabric no larger than the head of a pin will result in the hole being engaged by the tip of the pin 23, which is brought into registry with the hole and causes the rocking of the corresponding support bar 19. Thus, the respective switch 36 is actuated and closed by the cam face 26 swinging the switch arm 38, causing the energization of the respective indicating device 41 and the relay solenoid 42. The relay, in turn, may actuate an audible signal device or deactivate or disengage the motor advancing the fabric. The device 41 indicates the position of the defect in the fabric, which may then be treated as desired, disengaged from the pins 23, and the inspection continued after the tripped support bar 19 has been permitted to return to its untripped position, and the corresponding switch 36 opened. It should be noted that where only a single sided fabric is being examined, only one set of support bars 19 is necessary.

Furthermore, it has been observed, that the fabric, as it passes over the tips of the pins 23, has imparted to it a contour, consisting of a zigzag ridging with surrounding intervening valleys, as seen in Figure 4 of the drawings. The ridges are observed, even in the absence of the intermediate rows of pins 23, which coincide with the ridges. It is believed that this phenomenon lends greatly to the sensitivity of the apparatus.

Furthermore, the fact that the pins 23 are uninterrupted in their longitudinal extent, permits the thorough inspection of the entire width of the fabric.

If desired, as will be readily understood, the switches may be normally closed, and when the pins and support bars are actuated, the circuits will be opened to stop the motor or machine, or initiate any desired sequence of events.

While there has been described and illustrated a preferred embodiment of the present invention, it is apparent that numerous omissions and alterations may be made without departing from the spirit thereof.

I claim:

1. An inspection apparatus of the character described, comprising a longitudinally extending movable support and a plurality of sensing elements mounted on and projecting from said support, said elements being arranged in mutually staggered relationship along said support and being substantially uninterrupted in their longitudinal extent.

2. An inspection apparatus of the character described, comprising a longitudinally extending movable support, and a plurality of pins mounted on and projecting from said support, said pins being disposed in longitudinally extending zigzag arrangement upon said support and being substantially uninterrupted in their longitudinal extent.

3. An inspection apparatus as claimed in claim 2, in which there is provided means which are responsive to the movement of said longitudinal support.

4. An inspection apparatus as claimed in claim 2, wherein the tips of said pins lie in a cylindrical plane.

5. An inspection apparatus of the character described, comprising a longitudinal support bar, mounted for limited rocking motion about its longitudinal axis, a plurality of pins mounted on and projecting outwardly from said support bar, said pins being arranged in a substantially uninterrupted zig-zag pattern along said support bar, and means urging said support bar to a predetermined position in its rocking motion.

6. An inspection apparatus as claimed in claim 5, wherein said pins are arranged in longitudinally extending rows and are staggered relative to each other.

7. An inspection apparatus as claimed in claim 6, wherein said pins are substantially uninterrupted in their longitudinal extent.

8. An inspection apparatus of the character described, comprising an axle, a longitudinal support bar rotatably mounted on said axle and having a front face, a plurality of pins mounted on and projecting from said front face, said pins being arranged in a zig-zag pattern on said front face, and being mutually spaced from each other, and substantially uninterrupted in their longitudinal extent, the tips of said pins lying in a cylindrical plane, and means normally urging said support bar to a predetermined angular position.

9. An inspection apparatus as claimed in claim 8, wherein a plurality of said support bars are mounted upon said axle in abutting end to end relationship.

10. An apparatus as claimed in claim 9, wherein an electric switch is associated with each of said support bars, and is actuated by a predetermined rotation thereof from said predetermined angular position.

LEONARD W. BOLEY.

REFERENCES CITED

The following references are of record in the file of this patent:

UNITED STATES PATENTS

| Number | Name | Date |
| --- | --- | --- |
| 701,248 | Bannon | May 27, 1902 |
| 1,325,350 | Carter | Dec. 16, 1919 |
| 1,340,152 | Campbell | May 18, 1920 |
| 1,368,489 | Crumley | Feb. 15, 1921 |
| 1,784,446 | Jennings | Dec. 9, 1930 |
| 2,448,639 | Wachsman | Sept. 7, 1948 |
| 2,570,995 | Vossen | Oct. 9, 1951 |

FOREIGN PATENTS

| Number | Country | Date |
| --- | --- | --- |
| 569,757 | Great Britain | June 7, 1945 |